United States Patent [19]

Nielsen et al.

[11] Patent Number: 4,824,157

[45] Date of Patent: Apr. 25, 1989

[54] UTILITY CAGE FOR VEHICLES

[76] Inventors: Wade S. Nielsen, 9232 Stanford La.; Steven L. Abshier, P.O. Box 307, both of Durham, Calif. 95938

[21] Appl. No.: 185,951

[22] Filed: Apr. 25, 1988

[51] Int. Cl.[4] .................................................. B60P 7/02
[52] U.S. Cl. ........................................ 296/100; 296/3; 296/10; 296/61
[58] Field of Search ................... 296/3, 10, 61, 100, 296/159, 164

[56] References Cited

U.S. PATENT DOCUMENTS

| | | | |
|---|---|---|---|
| 1,671,848 | 5/1928 | Wallace et al. | 296/3 |
| 2,043,858 | 6/1936 | Moore | 296/100 |
| 3,148,912 | 9/1964 | Curtis et al. | 296/3 X |
| 3,613,920 | 10/1971 | Flamm | 296/3 X |
| 3,989,148 | 11/1976 | Donohue | 296/10 X |
| 4,564,216 | 1/1986 | Kinyon et al. | 296/10 X |

Primary Examiner—Robert B. Reeves
Assistant Examiner—John M. Gruber

[57] ABSTRACT

A utility cage for vehicles is particularly shaped half octagon upwardly from a wide horizontal base. The cage is primarily designed for use on the bed of a pickup truck and has adjustable attachment fittings compatible with stake apertures in the pickup truck bed side walls. The cage has tubular frame support members and tubular framed panels fully covered on one side by expanded metal material. Conformingly shaped side panels removably pivotally attached to a frontal end panel and rear support members can be exchanged, reversed, and turned over for placement into a variety of use positions. A rear panel is upwardly hinged to the rear support members for opening, closing or removal. A reinforced removable top panel can be used as a secondary bed in a pickup truck, as a loading ramp, or as a table-like extension the pickup truck tailgate. The side panels can be turned upwardly and a covering placed over the caged area.

10 Claims, 5 Drawing Sheets

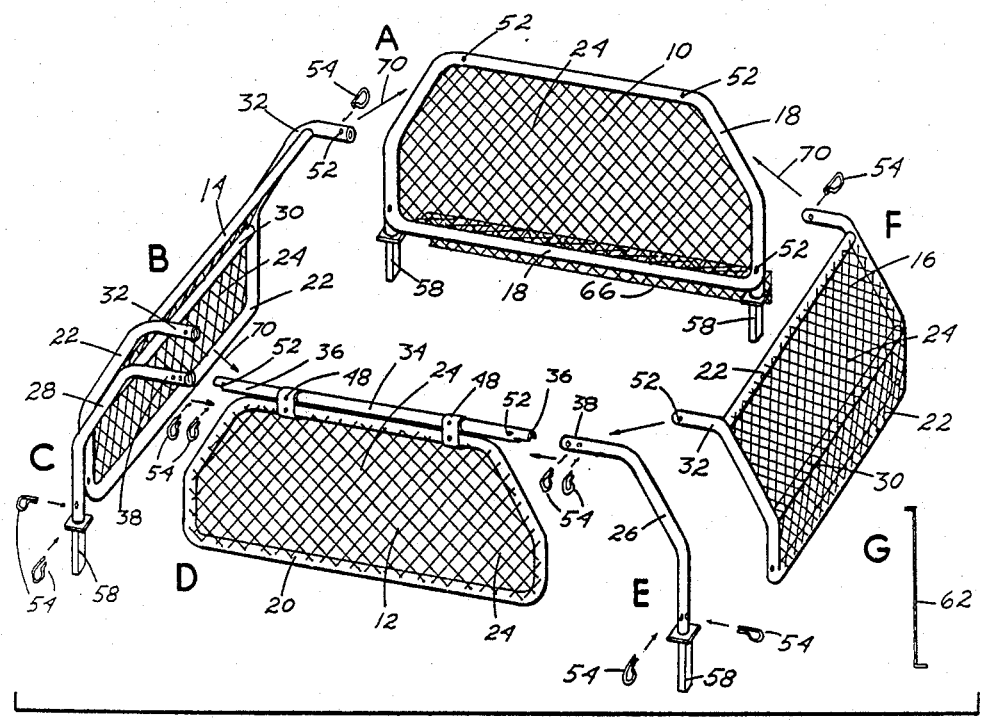
Fig. 1
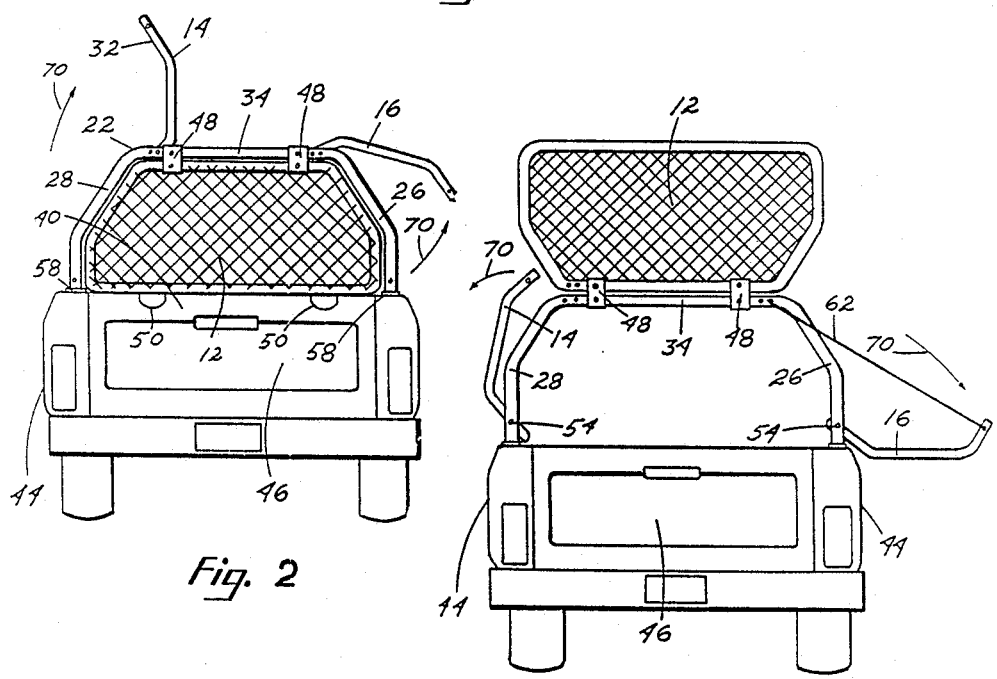
Fig. 2
Fig. 3

UTILITY CAGE FOR VEHICLES

BACKGROUND OF THE INVENTION

1. Field of the Invention

This invention relates to cages and utility cargo racks for the beds of pickup trucks and trailers. The present invention is particularly directed towards a multipurpose, hinged framed cage and utility rack designed for a variety of uses including a loading ramp, a protective cage for animals and a theft resistant enclosure for articles left in the bed of the vehicle.

2. Description of the Prior Art

A variety of livestock cages and utility racks for pickup trucks have been in use for some time. One principal problem arising with the use of these devices is the absence of security locking features and their limited range of use. Although utility and cargo racks for trucks are useful for hauling long items such as lumber or ladders, and stock racks are useful for transporting livestock, they are generally limited to their specific uses. This is quite obvious from an examination of past art patents.

To examine pertinent past art patents, GAU 312 was considered, and a search was conducted in the following classes and subclasses: 119/82, 7, 8, 9, 10, 11, 12, 15, 17; 296/100, 10, 106, 120A; and 180/289. In relationship to our invention, the following patents were noted as being most pertinent: 2,043,858; 2,909,387; 3,428,359; 3,456,977; 3,923,334; 3,930,680; 3,989,148; 4,284,303; and 4,668,002.

U.S. Pat. No. 2,043,858 teaches a cover far a truck that covers all open areas including the top. The top is shown to pivot open in the FIG. 3 illustration.

U.S. Pat. No. 3,930,680 teaches a truck with mesh panels that enclose the back area of the truck.

U.S. Pat. No. 3,989,148 teaches mesh sides for a pickup in which one side panel can be used as a ramp.

The other patents are cited to show what is representative in the art.

Most of the cage-like covers shown for use on the bed of a pickup truck or a trailer were either too low profile for animal use or if large enough, required considerable superstructure or solid backing limiting usefulness of the caging and detracting from structural appearance.

When using a cage and utility covering for a pickup truck bed, the shaping of the support members and the cage frame is a primary factor if multiple use of the cage sections is to be adequately accomplished. For example, using a unreinforced side panel as a drive up ramp as shown in U.S. Pat. No. 3,989,148 provides a ramping member ok but on a very unsubstantial support. To load a small tractor would require additional supports. A machine of any useful size and power would bend the supports and would probably be large enough so it wouldn't fit in the cage area as illustrated.

Although U.S. Pat. No. 2,043,858 illustrates a side cage structure which pivots open horizontally, the invention does not use cage frame shape for any other utility, and the cage sides hang freely down and must be hooked to prevent swinging.

A complete cage frame for the back of a large truck is disclosed in U.S. Pat. No. 3,930,680. For security, a solidly retained frame of this nature is criterion for the purpose. For versatility, a light weight, easily mounted and unmounted cage structure is far better for use on a pickup truck bed.

All of the cages shown for pickup truck bed or trailer use either had short horizontal panels or had an unnecessary vertical brace half way along the panel. To prevent possibly head injury to any animals being transported inside our cage, we have avoided vertical supports except at the very ends of the cage structure. None of the devices illustrated in past art patents seen used any kind of cage shaping to provide a multiple of uses for the side and top panels nor were any structural provisions made for easy assembling and mounting or for disassembly for transporting or storage.

As will be shown further in the specification which follows, our invention not only overcomes major disadvantages seen in all patent disclosures of pertinent truck bed caging devices but utilizes the cage structure in new and unique ways.

SUMMARY OF THE INVENTION

In practicing our invention we have developed an easily assembled and easily installed cage for vehicles, primarily for use on the bed of a pickup truck. The unique shape of the side cage panels allows them to be pivoted upwardly as a raised top closure for the cage, turned over and swung downwardly as horizontally aligned extended side carriage or work racks, and swung inside the truck bed as a raised second deck. A roof panel, specially framed and reinforced, can be used as a top cage covering for carrying ladders and materials to a job site, can be fastened as a raised bed to the truck bed inside frame, can be used as a rear extension to the truck bed with one end supported on a pedestal, or can be used as a loading ramp at the rear of the pickup of sufficient length to provide an easy-up incline. The roof panel is of sufficient strength to support considerable weight.

The half octagonal shape of the front and rear framing members produces a pleasing appearance in the cage structure. This frame shape is the primary unique factor of the invention. The particular shaping of the cage structure and the pin hinging allows pivotal panels to be interchanged, reversed, turned over, and used for a variety of purposes. The shape design also works well for the top hinging of a similarly configured back panel and for security fitting of extended material on the lower leading edge of a like front panel. Both side panels and the back panel are removably hinged to the frame, the side panels by self-locking removable pins. The back panel is hingedly attached upwardly by strap and tubular hinging to a horizontally aligned section of supporting frame members. The supporting frame members are sectional for easily dismantling, fit directly or have adjustable auxiliary structure to align with stake apertures in the horizontal truck bed shoulder of various pickup truck beds into which the lower ends or the auxiliary pins are inserted.

The side panels of our cage can be turned and pivoted upwardly to form a somewhat peaked roof frame. Over the roof frame and cage support members, a waterproof covering can be attached to provide a weather resistant shelter for the pickup truck bed.

Therefore, a principal object of our invention is to provide a utility cage with carrier provisions for use on the bed of a pickup truck.

Another object of the invention is to provide a cage suitable to accommodate one or a few untethered animals protected in the bed of a pickup truck.

A further object of the present invention is to provide a security and work covering for the bed of a pickup truck which is cage-like having pivotal and removable side and top panels with the panels being capable of being repositioned for a variety of uses.

Other objects and the many unique advantages of the invention will become obvious from a reading of the specification and considering numbered parts therein in the light of similarly numbered parts shown on the drawings.

BRIEF DESCRIPTION OF THE DRAWINGS

In the drawings:

FIG. 1 is an exploded view of the invention showing the front or cab frame member at A, the left or driver side panel at B, the rear left side support frame at C, the tale gate panel and upper hinge frame at D, the rear right side support frame at E, the right or passenger side panel at F, and a support rod for horizontal alignment of side panels at G.

FIG. 2 is a rear view of a pickup truck with the utility cage assembled and installed on the bed frame and illustrates the side panels angled out in opened positions and the tailgate panel fastened down.

FIG. 3 shows the rear of the pickup truck, the cage installed, the tailgate opened upwardly, and the side panels repositioned to open outwardly supported by a support rod as work or load shelves.

Figure 4:
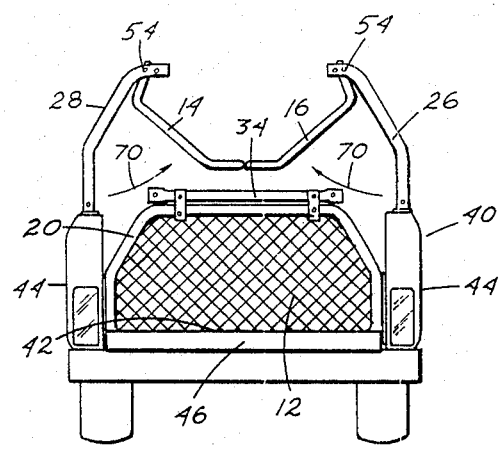
FIG. 4 shows cage in the pickup truck bed with the tailgate opened and the rear cage panel in the tailgate position. The side panels are shown in an inverted, top-attached position forming a raised carrier bed well above the pickup truck bed.

DRAWING REFERENCE NUMERALS 10 cab end front cage panel
12 tailgate end rear cage panel
14 driver left side cage panel
16 passenger right side cage panel
18 front cage panel framing
20 rear cage panel framing
22 side cage panel framing
24 expanded metal caging material
26 right rear cage support member
28 left rear cage support member
30 angle-forming horizontal side panel brace
32 angled side panel pivotal hangers
34 rear cage panel hinge bar
36 female attachment ends
38 male attachments ends
40 pickup truck
42 pickup truck bed
44 truck side walls
46 truck tailgate
48 strap and tube hinge fittings
50 attachment tabs
52 locking hinge pin apertures
54 locking hinge pin
56 S-type hangers
58 side wall inserts
60 offset side wall inserts
62 support rod
64 pedestal
66 security front panel extension
68 waterproof covering
70 directional arrows
72 padlock
74 reinforced top cage panel
76 top panel frame
78 top panel longitudinal support members
80 top panel handle openings
82 cover attachments
84 frame attachment clip
86 illustrative ladder
88 ring
90 spring biased ball bearings
92 wide bed pickup truck
94 narrow bed pickup truck

DESCRIPTION OF THE PREFERRED EMBODIMENT

Referring now to the drawings at FIG. 1. The disassembled parts of the invention are shown placed for assembly and are described as positioned in the drawings. A first end cage panel member designated cab end front cage panel 10, illustrated at FIG. 1 A, is a half octagonal shaped member formed of front cage panel framing 18 and covered by expanded metal caging material 24. Expanded metal cage material 24, is angled outward below the lower horizontal section of front cage panel framing 18 and forms security front panel extension 66. Towards the corners on the upper horizontal section of front cage panel framing 18, locking hinge pin apertures 52 are opened and side wall inserts 58 are attached downwardly to extending ends at the lower corners of front cage panel framing 18. FIG. 1 B shows driver left side cage panel 14 which is formed as a single panel of expanded metal caging material 24 affixed to side cage panel framing 22. Both vertical ends of side cage panel framing 22 extend upwardly above the top horizontal frame and are formed into angled side panel pivotal hangers 32. Locking hinge pin apertures 52 pass through the ends of angled side panel pivotal hangers 32 positioned for pin-hinging by locking hinge pin 54 inserted and attached through locking hinge pin apertures 52 in front cage panel framing 18. It is noted that locking hinge pin 54 has a ring attached through an aperture at one end, see FIG. 14, to prevent pull-through and snap-in ball bearing stops towards both ends to retain the pin in locking hinge pin apertures 52 and acts as a pin hinge allowing pivotal movement of the attached members. Angle-forming horizontal side panel brace 30 is affixed in driver left side cage panel 14 approximately a third of the way upwardly from the lower horizontal member of side cage panel framing 22 shaping driver left side panel 14 to conform with the frame shape of cab end front cage panel 10.

Passenger right side cage panel 16 is shown in FIG. 1 at F and is essentially a reversed version of driver left side cage panel 14. The same framing and frame designation numbers, attachment features and feature designation numbers, and bracing and bracing designation numbers are used in both passenger right side cage panel 16 and driver left side cage panel 14 as the two sides turned end for end are actually interchangeable.

At C in FIG. 1, left rear cage support member 28 is illustrated. Along with right rear cage support member 26, shown at F in FIG. 1, when both are upwardly attached to rear cage panel hinge bar 34, FIG. 1 D, these two members support the full cage structure adjacent the tailgate end of a pickup. Both rear cage support members, 26 and 28, are fitted downwardly to side wall inserts 58 retained by locking hinge pins 54 through locking hinge pin apertures 52. In FIG. 1 at G, support rod 62 is illustrated. Support rod 62 has reversed right angled tip ends and is useful for holding opened panels of the cage in fixed positions, see FIG. 3 and FIG. 6.

A second end cage panel member is designated tailgate end rear cage panel 12 and is shown in FIG. 1 at D. Attached by strap and tube hinge fittings 48 to rear cage panel hinge bar 34, tailgate end rear cage panel 12 is shaped to conform with cab end front cage panel 10 and the angled structural shape produced when rear cage support members 26 and 28 are attached to rear cage panel hinge bar 34. Both ends of rear cage panel hinge bar 34 are shaped into female attachment ends 36. The upper ends of both right rear cage support member 26 and left rear cage support member 28 are formed into male attachment ends 38. These male and female fittings attached by locking hinge pin 54 through apertures 52 connect rear cage panel hinge bar 34 to the rear cage support members 26 and 28. The pin hinging and angled shape of the entire cage structure is extremely important for utility functions of which this device is capable and are described further on in the specification.

FIG. 2 is a rear view of a pickup truck 40. Rear support members 26 nd 28 are attached upwardly to rear cage panel hinge bar 34 and are fastened to the top of truck side walls 44 by side wall inserts 58. Side wall inserts 58 fit into the standard stake apertures in the top of truck side walls 44. Side cage panels 14 and 16, in this assemblage, are pivotal and can be raised or lowered as indicated by directional arrows 70. Tailgate end rear cage panel 12 is hingedly attached along the upper horizontal section of rear cage panel framing 20 to to rear cage panel hinge bar 34 by strap and tube hinge fittings 48. This allows tailgate end rear cage panel 12 to be swung upward as shown in FIG. 3 or swung downward and locked by attachment tabs 50 as shown in FIG. 2. In FIG. 3, a downwardly fastening of side cage panels 14 and 16 is illustrated with the side cage panels useful for work surfaces, tool containers, or external cargo carriers. The FIG. 3 illustration shows passenger right side cage panel 16 retained in a horizontal position by support rod 62.

Another useful positioning of side cage panels 14 and 16 is shown in FIG. 4. Truck tailgate 46 is opened and tailgate end rear cage panel 12 is unfastened and placed in the tailgate position blocking entrance and exit to pickup truck bed 42. The side cage panels 14 and 16 are swung inward, fastened together, and formed into a raised cargo support area well above pickup truck bed 42 which is also useful for tools or cargo with the side cage panels in this position. Repositioning the cage panels for a variety of different uses is easily accomplished by simply removing locking hinge pins 54, repositioning angled side panel pivotal hangers 32 to line up various locking hinge pin apertures 52 and inserting locking hinge pins 54. In all illustrations, directional arrows 70 indicate direction of movement either way.

Figure 5:
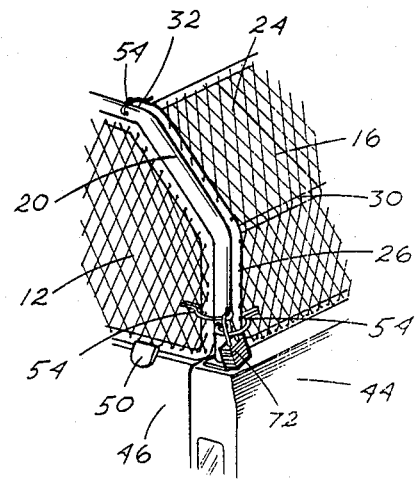
FIG. 5 is a sectional perspective view of the right rear corner of the closed cage on the pickup bed illustrating padlocking the looped ends of the attachment pin structure for securely locking the cage.

In FIG. 5, a partial right hand corner view of the truck side wall 44 with the utility cage of the invention installed illustrates a locking method. The shackle of padlock 72 is attached through the rings of the locking hinge pins 54 at the corner of the cage and locking padlock 72 secures the cage structure.

Figure 6:
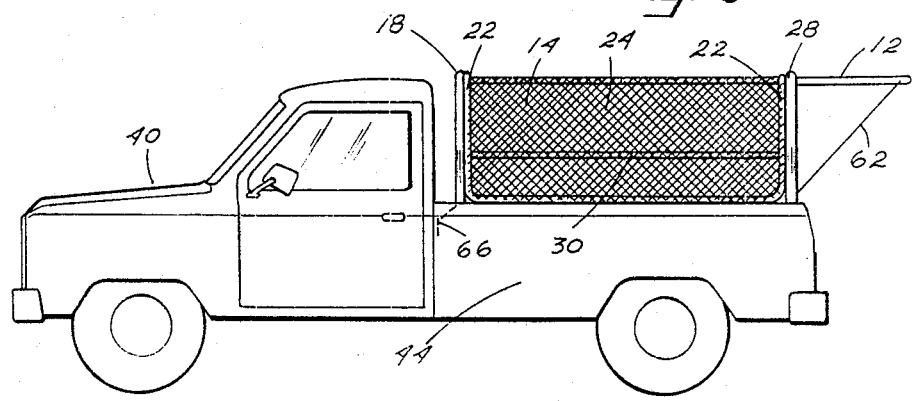
FIG. 6 shows the pickup truck with the cage installed on the bed in a side view illustrating the top hinged rear panel opened and supported by the support rod.

FIG. 6 is a side elevation of pickup truck 40 with the utility cage installed. The vertical sections of front cage panel framing 18 and side cage panel framing 22 are adjacently aligned. The side view shows a substantially rectangular driver left side cage panel 14 covered by expanded metal caging material 24. Inside along a lower section, angle-forming horizontal side panel brace 30 longitudinally supports the cage frame. The forward extension of expanded metal caging material 24 below front cage panel framing 18 forming security front panel extension 66 is shown by dotted lines in FIG. 6. The vertical rear section of side cage panel framing 22 is adjacent vertical left rear cage support member 28. The cage structure is fastened to rest atop of truck side walls 44. Tailgate end rear panel 12 is in the opened position retained by support rod 62.

Figure 7:
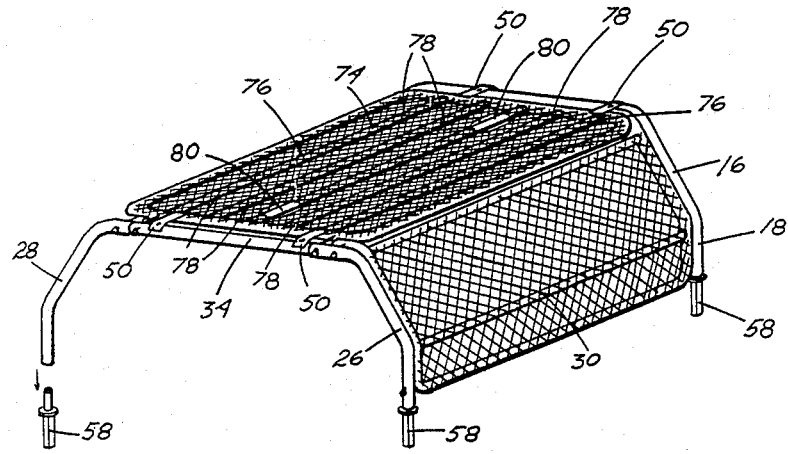
FIG. 7 shows the top cage panel on the cage frame in a perspective view illustrating the reinforced structure and positioning of the top cage panel in relationship to the right side panel. One truck wall insert fitting is shown detached and aligned for attachment to the rear cage frame member.
Figure 8:
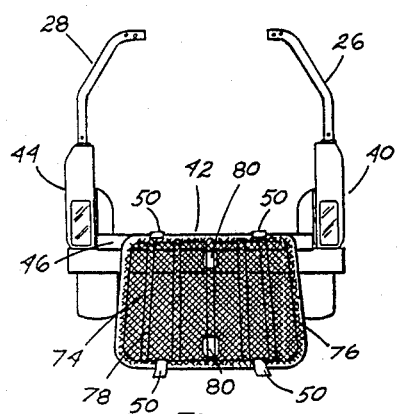
FIG. 8 illustrates the top reinforced cage panel at the rear of the pickup truck bed positioned for use as loading ramp.

Reinforced cage top panel 74 is shown in a prospective illustration on top the cage frame structure in FIG. 7. Reinforced cage top panel 74, a substantially rectangular configuration, is framed by top panel frame 76 and strengthened by top panel longitudinal support members 78. Attachment tabs 50 locked on by locking hinge pins 54 releasably hold reinforced cage top panel 74 positioned. Two centrally aligned openings one towards each ends in reinforced cage top panel 74 form top panel handle openings 80 used for lifting and repositioning reinforced cage top panel 74. As illustrated in FIG. 8, reinforced cage top panel 74 can be positioned for use as a ramp at the rear of pickup truck 40. Reinforced cage top panel 74 is sufficiently strong to support considerable weight on a low-angled upgrade and attachment tabs 50 with locking hinge pins 54 installed can be used to retain the ramp in position against pickup truck bed 42.

Figure 9:
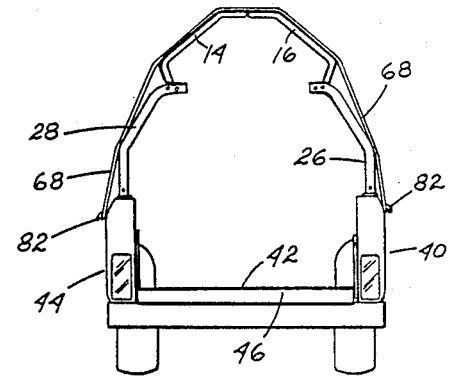
FIG. 9 shows the cage on the truck bed with side panels hinged at the shorter ends and positioned upwards to form an enclosure supporting a waterproof covering.
Figure 10:
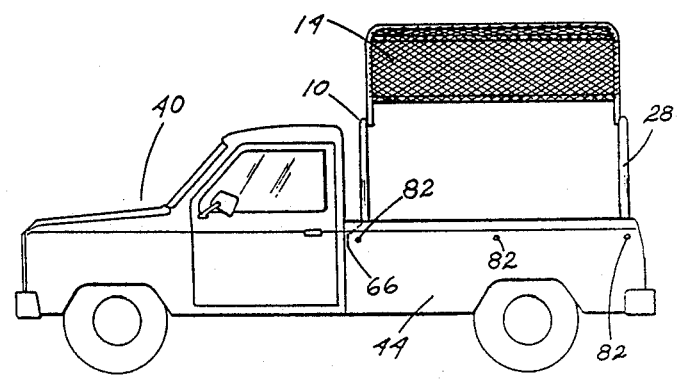
FIG. 10 is a side view of the truck and upwardly positioned side panels shown from the rear in FIG. 9.

FIG. 9 reveals another unique application of the present invention. Side cage panels 14 and 16 unfastened, inverted, and refastened are angled and attached upwardly to form a roof-like support over which waterproof covering 68 can be fitted. Cover attachments 82 hold waterproof covering 68 in place. The side view of pickup truck 40 in FIG. 10 further illustrates the upward positioning of side cage panels 14 and 16.

Figure 11:
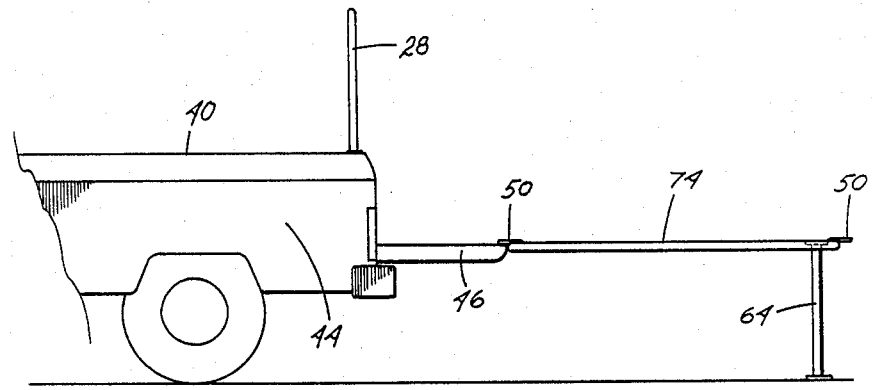
FIG. 11 is a rear portion side view of the pickup truck illustrating the tailgate horizontally positioned and the top reinforced cage panel supported at the end by a special pedestal used table-like as a horizontal extension of the tailgate.
Figure 12:
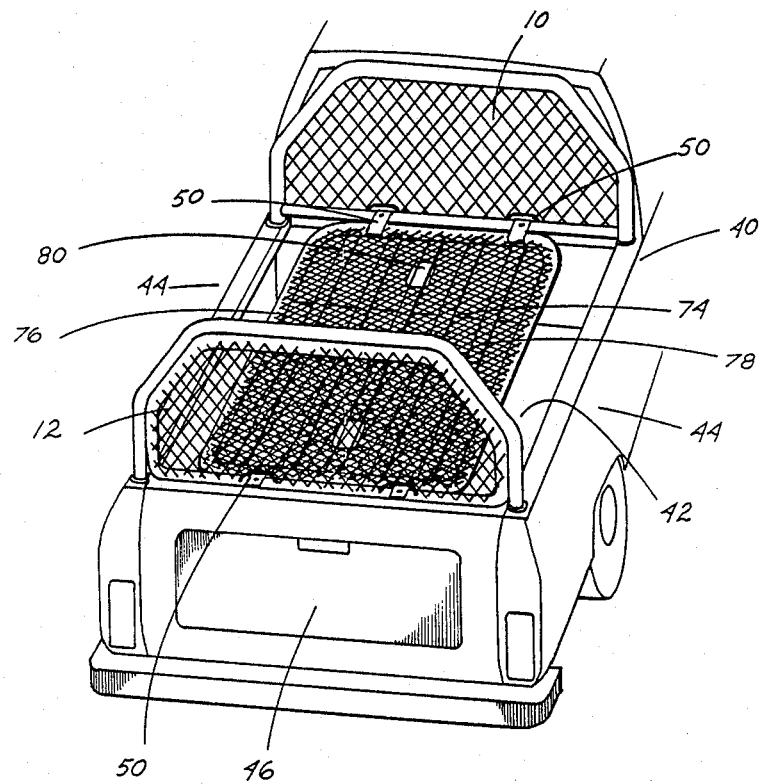
FIG. 12 is a perspective view of the pickup truck bed, the cage support frame installed with the side panels removed, and showing the top reinforced cage panel attached to the front and rear cage frame in use as a raised platform.

In FIG. 11 and FIG. 12 additional useful applications of reinforced cage top panel 74 is disclosed. The partial view of pickup truck 40 in FIG. 11 shows truck tailgate 46 opened horizontally and reinforced cage top panel 74 affixed as a horizontally positioned work surface continuation supported at the end by pedestal 64. The perspective view of the bed area of pickup truck 40 in FIG. 12 illustrates use of the reinforced cage top panel 74 as a lengthwise railing-height decking over pickup truck bed 42 between truck side walls 44.

Figure 13:
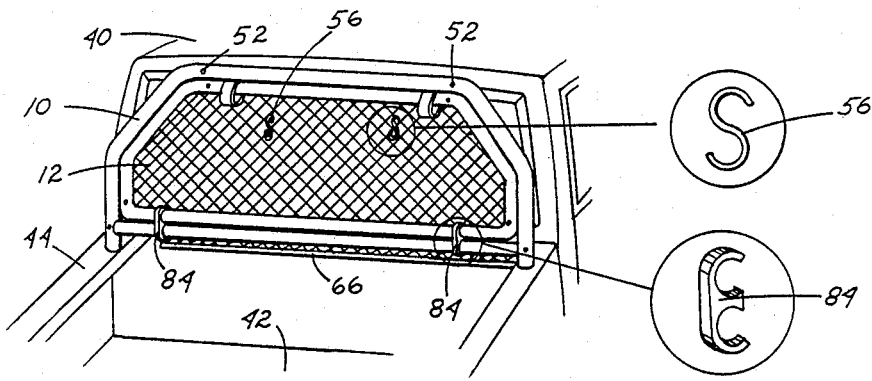
FIG. 13 shows the back of the pickup truck cab and the front cage panel attached to the cage frame with enlargements illustrating S-type bed frame support fittings and frame attachment fittings.

The back of the cab area of pickup truck 40 is illustration in part at FIG. 13 in a perspective view. Tailgate end rear cage panel 12 is shown attached to cab end front cage panel 10 for disassembled transporting. Tailgate end rear cage panel 12 is retained by two types of fittings designated S-type hangers 56 and frame attachment clips 84. The S-type hangers 56 hook through the expanded metal caging material 24 on both panels to hold them together. The frame attachment clips 84 snap over the frames 18 and 20 to secure the frames. Enlargements of both the S-type hangers 56 and the frame attachment clips 84 are shown in the drawings at FIG. 13.

Figure 14:
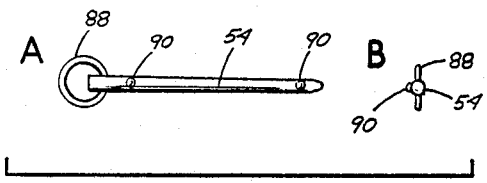
FIG. 14 illustrates a locking hinge pin in a side view at A and in an end view at B.

The locking hinge pin 54, used exclusively for locking cage members together and for the pivotal hinging of the cage panels, is illustrated at FIG. 14. A ring 88 affixed through an aperture at one end of pin 54 is used as a locking means and as a stop preventing locking hinge pin 54 from being pulled on through locking hinge pin apertures 52. Spring biased ball bearings 90 partly protruding through the wall surface one adjacent each end of locking hinge pin 54 prevent vibrational dispositioning of locking hinge pin 54 when it is installed in locking hinge pin apertures 52.

Figure 15:
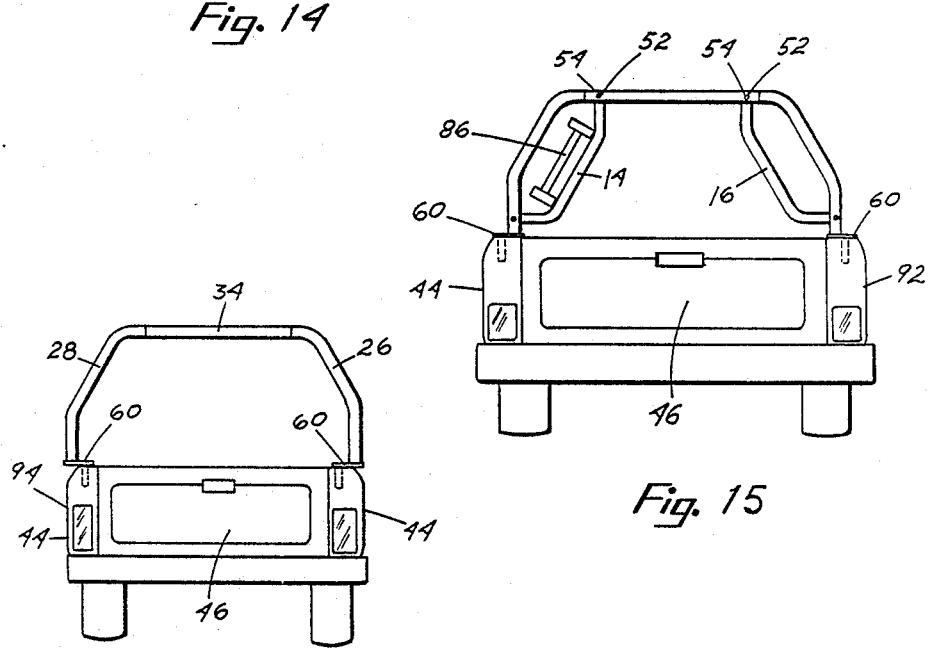
FIG. 15 shows a rear view of a wide bodied pickup truck wit the cage frame installed showing reverse positioning of the side cage panels to form concave equipment compartments and the cage fame attached to the wider bed walls by offset insert pins.
Figure 16:
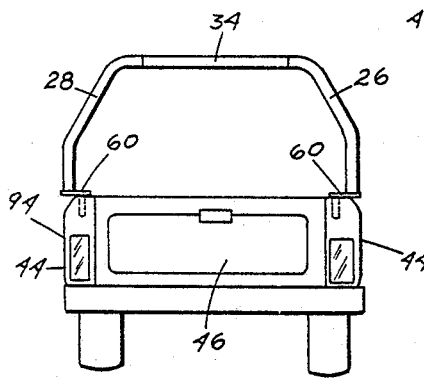
FIG. 16 shows the cage frame attached to a narrow pickup truck bed wall illustrating attachment of the cage frame to the narrow truck bed wall by reversing the offset insert pins.

FIG. 15 is illustrative of the utility cage installed on a wide pickup truck 92. Offset side wall inserts 60 are turned extended part outward to fit the stake apertures in truck side walls 44 and effect attachment of a standards sized utility cage. Side cage panels 14 and 16 have been detached, turned around, and reattached to produce yet another function of the present invention. With side cage panels 14 and 16 installed as illustrated in FIG. 15, a concave cargo or equipment are is produced paralleling truck side walls 44. As shown, illustrative ladder 86 can be carried in the concave cargo space. FIG. 16 is illustrative of the utility cage assemblage installed on a narrow bed pickup truck 94. Offset side wall inserts 60 have been turned with the extensions inward to fit a standard sized cage to stake apertures in the narrower truck side walls 44.

The utility cage for vehicles constituting the present invention is easy to assemble and install. Actually the cage can be assembled during installation. Cab end front cage panel 10 is attached adjacent the cab of pickup truck 40 (FIG. 6) by inserting side wall inserts 58 into the front stake apertures in truck side walls 44. The cage structure goes together as indicated in FIG. 1 by directional arrows 70. The upper ends of rear cage support members 26 and 28 are inserted into the tubular ends of cage panel hinge bar 34 with tailgate rear cage panel hingedly attached by strap and tube hinge fittings 48. The assembled rear structure is mounted on truck side walls 44 by side wall inserts 58 in stake apertures in truck side walls 44 adjacent truck tailgate 46. Driver left side cage panel 14 is attached by locking hinge pin 54 through locking hinge pin apertures 52 upwardly at the rear to left rear cage support member 28 and again at the front upwardly to front cage panel framing 18 similarly. Passenger right side cage panel 16 oppositely similarly attached. The utility cage for vehicles of the present invention is assembled, installed on the pickup truck, an ready for use. Animals or cargo can be carried safely inside the cage and locking is effected as previously described.

For top closure and additional security, reinforced cage top panel 74 can be installed and locked in the opened space at the top of the cage between side cage panels 14 and 16. Cargo or tools can be carried on top of the cage structure with reinforced cage top panel 74 installed. Top panel 74 is also useful as an internal raised decking and as a loading ramp as described.

Although we have supplied considerable details of our invention in the specification, it is to be understood that in practice we may modify the design and change the structure somewhat so long as changes made do not depart from the intent of the scope of the appended claims.

What we claim is:

1. A utility cage for vehicles comprising,
 a dismantlable cage structure including:
 a first vertically oriented end cage panel member configured in a particular shape;
 a second vertically oriented end cage panel member configured in a particular shape;
 said particular shape of both said end cage panel members being substantially a half octagon figure formed upwardly from a long horizontal base as if cut centrally diametrically through said octagon;
 said first and said second end cage panel members both fabricated of tubular edge framing fully covered on one side with expanded metal material;
 said first end cage panel member being a singular structure with cornerwise downwardly extending insert attachment means sized and arranged adjustably to fit existing stake apertures in various vehicles particularly pickup truck side walls and side-walled trailers;
 said second end cage panel member upwardly hingedly attached to a secondary conformingly shaped framing with said conformingly shaped framing dismantlable and downwardly affixed cornerwise with said downwardly extending insert attachment means adjustably compatible to said stake apertures in said vehicles and particularly said pickup truck side walls and said side-walled trailers;
 two interchangeable substantially rectangular side cage panels longitudinally horizontally oriented, each said side cage panel being a tubular frame with expanded metal material covering one side, each said side cage panel affixed with a longitudinal tubular frame member positioned to angle said side cage panel expanded metal material in configuration with angled short-end vertical tubular framing of said side cage panels for symmetrical conformation vertically with said upwardly half-octagon shape of said vertically oriented end cage panels;

apertures positioned upwardly and downwardly in said tubular framing of said first end cage panel member and in said secondary framing of second end cage panel member placed for alignment with apertures in angled hanger extensions at all four corners of said tubular edge support frame of both said side cage panels, said apertures arranged for changeable pin hinging pivotally of said side cage panels to said first end cage panel and said secondary framing of said second end cage panel;

pivotal hinge pins having snap-in retainer means and sized to removably fit said apertures;

a combination stop and locking means affixed at one terminal end of each of said pivotal hinge pins;

a substantially rectangular top cage panel sized and oriented for flat positioning removably attached atop said cage structure, said top cage panel longitudinally aligned with said horizontally longitudinally aligned side cage panels, said top cage panel tubular framed with rounded corners and reinforced substantially with longitudinal tubular supports centrally spaced in said top cage panel tubular frame and having one side covered with expanded metal material, there being attachment means at both shorter ends of said top cage panel and hand grip openings one adjacent each said shorter end of said top cage panel aligned centrally and cut through said expanded metal material covering;

means for attaching said top cage panel in the opened tailgate area of a pickup truck for ramp use;

means for supporting a free end of said top cage panel sufficiently elevated to be positioned as an extension of said pickup truck tailgate;

means for retaining said side cage panels and said upwardly hinged second end cage panel in fixed open positions;

means for blocking access to said pickup truck bed between said first end cage panel and the back of the cab housing of said pickup truck;

means for attaching said tubular frame of said second end cage Panel member immediately to said tubular frame of said first end cage panel member;

covering means with attachments removably fitting over and supported by said cage structure.

2. The utility cage for vehicles of claim 1 having as said combination stop and locking means a metal ring of sufficient diameter to freely accept an ordinarily sized padlock shackle with said metal ring free-moving in an aperture in one said terminal end of each of said pivotal hinge pins.

3. The utility cage for vehicles of claim 1 where said attachment means at both shorter ends of said top cage panel are pairs of paralleling tabs attached to said frames at said shorter ends of said top cage panel extending sufficiently to clip over said tubular frame of said first end cage panel member and to clip over said tubular frame of said conformingly shaped framing hingedly supporting said second end cage panel member.

4. The utility cage for vehicles of claim 1 wherein said means for attaching said top cage panel for ramp use in said opened tailgate area of said pickup truck is said tab attachment means apertured and fitted with a removable insert pin size to drop in the hinge area of said pickup truck tailgate or in a prepared aperture adjacent said tailgate hinge.

5. The utility cage for vehicles of claim 1 with said means for supporting said free end of said top cage panel elevated is a pedestal footed at each terminal end, length sized approximately to said pickup truck bed height.

6. The utility cage for vehicles of claim 1 wherein said means for retaining said side cage panels and said upwardly hinged second end cage panel member in said fixed open positions is a rod having short oppositely extending right angled ends.

7. The utility cage for vehicles of claim 1 where said means for blocking said access to said pickup truck bed between said singular structured first end cage panel and said back of said cab housing of said pickup truck is a right angled extension of said expanded metal material towards said back of said cab housing contacting the forward wall of said pickup truck bed.

8. The utility cage for vehicles of claim 1 wherein said covering means is a cloth waterproofed material.

9. The utility cage for vehicles said attachments for said covering means includes S-type hangers fastenable to said side walls of said pickup trucks and through said expanded metal material covering.

10. The utility cage for vehicles of claim 1 wherein said means for attaching said tubular frame of said second end cage panel member immediately to said tubular frame of said first end cage panel member is a clip having two circular openings adjacently positioned with both openings sufficiently parted on one side for snap-over retention of one said tubular frame fastened above the other.

* * * * *